US009048773B2

(12) United States Patent
Märgner et al.

(10) Patent No.: US 9,048,773 B2
(45) Date of Patent: Jun. 2, 2015

(54) METHOD AND DEVICE FOR REGULATING SEPARATELY EXCITED SYNCHRONOUS MACHINES

(75) Inventors: Moritz Märgner, Berlin (DE); Oliver Mill, Glienicke/Nordbahn (DE); Krzysztof Jaszczak, Lappersdorf (DE)

(73) Assignee: CONTINENTAL AUTOMOTIVE GMBH, Hanover (DE)

( * ) Notice: Subject to any disclaimer, the term of this patent is extended or adjusted under 35 U.S.C. 154(b) by 315 days.

(21) Appl. No.: 13/811,844

(22) PCT Filed: Jul. 1, 2011

(86) PCT No.: PCT/EP2011/061151
§ 371 (c)(1),
(2), (4) Date: Apr. 17, 2013

(87) PCT Pub. No.: WO2012/013447
PCT Pub. Date: Feb. 2, 2012

(65) Prior Publication Data
US 2013/0207589 A1 Aug. 15, 2013

(30) Foreign Application Priority Data

Jul. 28, 2010 (EP) .................................. 10007849
Nov. 5, 2010 (DE) ......................... 10 2010 043 492

(51) Int. Cl.
*H02P 23/00* (2006.01)
*B60L 11/02* (2006.01)
(Continued)

(52) U.S. Cl.
CPC .............. *H02P 23/0077* (2013.01); *B60L 11/02* (2013.01); *B60L 2220/14* (2013.01);
(Continued)

(58) Field of Classification Search
CPC .......... H02P 6/08; H02P 29/028; H02P 29/02; H02P 9/14; H02P 9/30; H02P 21/141; H02P 2207/05; H02P 25/021
USPC ............. 318/400.02, 400.03, 400.06, 400.15, 318/717, 434
See application file for complete search history.

(56) References Cited

U.S. PATENT DOCUMENTS 5,549,172 A * 8/1996 Mutoh et al. .................. 180/65.1
5,905,346 A * 5/1999 Yamada et al. .................. 318/50
(Continued)

FOREIGN PATENT DOCUMENTS

| CN | 1954486 A | 4/2007 | ............. H02P 21/00 |
|---|---|---|---|
| DE | 10036099 A1 | 2/2002 | ............. H02P 21/00 |

(Continued)

OTHER PUBLICATIONS

Chinese Office Action, Application No. 201180036777.8, 14 pages, Oct. 10, 2014.
(Continued)

*Primary Examiner* — Bentsu Ro
*Assistant Examiner* — Thai Dinh
(74) *Attorney, Agent, or Firm* — King & Spalding L.L.P.

(57) ABSTRACT

A regulating method and device for loss-optimized operation of a separately excited synchronous machine having a stator and a rotor are provided. The method may include: providing reference values for stator and rotor currents, wherein the reference value for the stator current and/or the reference value for the rotor current or an auxiliary parameter representing the reference value of the stator current and/or an auxiliary parameter representing the reference value of the rotor current is dependent on a predefined reference torque; providing maximum values for stator and rotor currents; comparing reference values for the stator and/or rotor currents or an auxiliary parameter representing the reference value of the stator current and/or an auxiliary parameter representing a reference value of the rotor current to the corresponding maximum values and reducing of the reference torque by a torque value if at least one reference value reaches or exceeds the corresponding maximum value.

11 Claims, 6 Drawing Sheets

(51) Int. Cl.
  *H02P 6/08* (2006.01)
  *H02P 9/14* (2006.01)
  *H02P 9/30* (2006.01)
  *H02P 29/00* (2006.01)
  *H02P 29/02* (2006.01)

(52) U.S. Cl.
  CPC . *H02P 6/08* (2013.01); *H02P 9/14* (2013.01); *H02P 9/30* (2013.01); *H02P 29/00* (2013.01); *H02P 29/0044* (2013.01); *H02P 29/02* (2013.01); *H02P 29/028* (2013.01); *Y02T 10/642* (2013.01); *Y02T 10/7077* (2013.01); *Y02T 10/70* (2013.01)

(56) References Cited

U.S. PATENT DOCUMENTS

| | | | | |
|---|---|---|---|---|
| 6,696,811 | B2* | 2/2004 | Reutlinger | 318/606 |
| 7,554,281 | B2 | 6/2009 | Satake et al. | 318/432 |
| 7,586,286 | B2* | 9/2009 | Cheng et al. | 318/807 |
| 7,602,153 | B2 | 10/2009 | Steiner | 322/59 |
| 8,410,742 | B2* | 4/2013 | Galic | 318/700 |
| 2004/0162696 | A1 | 8/2004 | Kumar | 702/132 |
| 2006/0124771 | A1 | 6/2006 | Catasus-Servia | |
| 2006/0126250 | A1 | 6/2006 | Sychra et al. | 361/103 |
| 2009/0088294 | A1 | 4/2009 | West et al. | 318/472 |

FOREIGN PATENT DOCUMENTS

| | | | | |
|---|---|---|---|---|
| DE | 10106944 | A1 | 9/2002 | H02H 7/085 |
| DE | 102005050741 | A1 | 4/2007 | H02H 5/04 |
| EP | 1923988 | A1 | 5/2008 | H02J 7/24 |
| JP | 2006290010 | A | 10/2006 | B60K 6/20 |
| JP | 2007089334 | A | 4/2007 | B60L 9/18 |
| JP | 2007259575 | A | 10/2007 | B60L 9/18 |
| JP | 2010098810 | A | 4/2010 | B62D 5/04 |
| JP | 2010116760 | A | 5/2010 | E02F 9/20 |
| WO | 2012/013447 | A2 | 2/2012 | B60L 11/02 |

OTHER PUBLICATIONS

Boldea, Ion et al., "BEGA Starter/Alternator—Vector Control Implementation and Performance for Wide Speed Range at Unity Power Factor Operation," IEEE Transactions on Industry Applications, vol. 46, No. 1, 9 pages, Jan./Feb. 2010.

German Office Action, Application No. 10 2010 043 492.2, 5 pages, Jul. 6, 2011.

International Search Report and Written Opinion, Application No. PCT/EP2011/061151, 15 pages, Feb. 17, 2012.

PCT/US2012/053866 International Preliminary Report on Patentability dated Mar. 20, 2014.

\* cited by examiner

US 9,048,773 B2

METHOD AND DEVICE FOR REGULATING SEPARATELY EXCITED SYNCHRONOUS MACHINES

CROSS-REFERENCE TO RELATED APPLICATIONS

This application is a U.S. National Stage Application of International Application No. PCT/EP2011/061151 filed Jul. 1, 2011, which designates the United States of America, and claims priority to EP Application No. 10007849.2 filed Jul. 28, 2010 and DE Application No. 10 2010 043 492.2 filed Nov. 5, 2010, the contents of which are hereby incorporated by reference in their entirety.

TECHNICAL FIELD

The present disclosure relates to a regulation method and a device for regulating synchronous machines, in particular separately excited synchronous machines.

BACKGROUND

The synchronous machine is one of the most important types of electric machines. Traditionally, the synchronous machine is used for generating electrical energy, for example. The electric machine, in particular the synchronous machine, is increasingly gaining significance as a drive assembly in motor vehicles. Here, the synchronous machine can be used, for example, in purely electrically driven vehicles and also in hybrid vehicles. There are substantial differences between permanent magnet synchronous machines and separately excited synchronous machines. Permanent magnet synchronous machines have a rotor on which permanent magnets are arranged. In the case of a separately excited synchronous machine, use is made of a rotor with a winding through which a field current flows via slip rings, as a result of which a magnetic excitation flux or rotor flux is produced on the rotor side which interacts with a rotating field generated via energized stator windings.

Separately excited synchronous machines are used, for example, in hybrid vehicles, in particular in axle hybrid drive systems. Hybrid technology is substantially characterized by the fact that two drive assemblies, an internal combustion engine and an electric machine are arranged in the vehicle. In this case, the motor can be connected, for example, to an axle differential parallel to the axle via a two-stage spur gear. In particular in the case of motor vehicle drive assemblies, safety is a particular criterion which needs to be taken into consideration when selecting the type of electric machines. Ideally, it should be possible to disconnect the motor at any point in time. One advantage of the separately excited synchronous machine is the fact that the rotor-side field current can be disconnected, whereas, in the case of permanent magnet synchronous machines, the rotor-side magnetic excitation flux cannot be disconnected during normal operation. An important aspect in the case of electric machines in motor vehicles concerns the losses occurring during operation since said losses need to be supplied either completely from a rechargeable battery or via a generator coupled to an internal combustion assembly. Together with the converter losses, these are referred to as driving cycle losses, for example. The losses characteristic is a particular criterion in the design of the electric machine, in particular the separately excited synchronous machine, and the associated regulation with the converter.

SUMMARY

One embodiment provides a regulation method for a separately excited synchronous machine having a stator and a rotor, said regulation method having the following steps: providing reference values for stator and rotor currents ($I_{S.ref}$, $I_{f.ref}$), wherein the reference value for the stator current and/or the reference value for the rotor current or an auxiliary variable representing the reference value for the stator current and/or an auxiliary variable representing the reference value for the rotor current is dependent on a predetermined reference torque ($T_{ref}$); providing maximum values for stator and rotator currents ($I_{S.max}$, $I_{f.max}$); comparing the reference values for the stator and/or rotor currents ($I_{S.ref}$, $I_{f.ref}$) or an auxiliary variable representing the reference value for the stator current and/or an auxiliary variable representing the reference value for the rotor current with the corresponding maximum values ($I_{S.max}$, $I_{f.max}$); and reducing the reference torque ($T_{ref}$) by a torque value (T') when at least one of the reference values reaches or exceeds its corresponding maximum value ($I_{S.max}$, $I_{f.max}$).

In a further embodiment, the reference values are stored in a lookup table (51), wherein these reference values each correspond to a minimum-losses operating point, represented by corresponding operational parameters ($T_{ref}$, n, $U_{DC}$).

In a further embodiment, maximum values for stator and rotor currents ($I_{S.max}$, $I_{f.max}$) are dependent on temperatures of specific components of the synchronous machine ($\theta_1$, $\theta_2$, ... ), on the rotation speed (n) and on the intermediate circuit voltage ($U_{DC}$).

In a further embodiment, the temperature of at least one of the following components of the synchronous machine is taken into consideration: stator winding, rotor winding, stator laminate stack, rotor laminate stack and rotor bearing. In a further embodiment, the rotation speed (n) is also taken into consideration.

In a further embodiment, the torque value (T'), reduced by the reference torque ($T_{ref}$), is dependent on the discrepancy between the reference value for the rotor current ($I_{f.ref}$) and the permissible maximum value for the rotor current ($I_{f.max}$) and/or on the discrepancy between the reference values for the stator current ($I_{S.ref}$) and the permissible maximum value for the stator current $I_{S.max}$).

In a further embodiment, prior to the reduction in the reference torque ($T_{ref}$), the discrepancy between the reference value for the stator current and the maximum value for the stator current is scaled.

In a further embodiment, a plurality of temperatures for the synchronous machine is compared with a plurality of maximum permissible temperatures, and in which the stator current and/or the rotor current is varied when at least one of the plurality of maximum temperatures is reached and/or exceeded in such a way that at least one of the plurality of maximum permissible temperatures is undershot again.

In a further embodiment, the regulation method further includes predictive torque regulation, in which the rotor current is increased or reduced predictively if a relatively high or a relatively low load on the shaft and/or high regulation dynamics is/are expected.

In a further embodiment, the auxiliary variable representing the reference value for the stator current and/or the auxiliary variable representing the reference value for the rotor current is/are formed from the ratio between the rotor current and the q component of the stator current.

Another embodiment provides a regulation device designed to regulate a separately excited synchronous machine with a stator and a rotor with low losses, the regulation device including: a memory unit, which is designed to provide reference values for stator and rotor currents, wherein the reference value for the stator current and/or the reference value for the rotor current or an auxiliary variable representing the reference value for the stator current and/or an auxiliary variable representing the reference value for the rotor current is dependent on a predetermined reference torque ($T_{ref}$), and maximum values for stator and rotor currents; and a processing unit, which is designed to compare the reference values for stator and rotor currents with the corresponding maximum values for stator and rotor currents and which is further designed to reduce the predetermined reference torque if at least one reference value for stator and rotor currents reaches or exceeds the corresponding maximum value.

BRIEF DESCRIPTION OF THE DRAWINGS

Exemplary embodiments will be explained in more detail below on the basis of the schematic drawings, wherein.

DETAILED DESCRIPTION

Embodiments of the present disclosure provide a regulation method and a corresponding device which enables losses-optimized operation of a separately excited synchronous machine with high regulation dynamics.

For example, some embodiment provide a regulation method for a separately excited synchronous machine having a stator and a rotor, said method having the following steps: providing reference values for stator and rotor currents, wherein the reference value for the stator current and/or the reference value for the rotor current or an auxiliary variable representing the reference value for the stator current and/or an auxiliary variable representing the reference value for the rotor current is dependent on a predetermined reference torque, providing maximum values for stator and rotator currents, comparing the reference values for the stator and/or rotor currents or an auxiliary variable representing the reference value for the stator current and/or an auxiliary variable representing the reference value for the rotor current with the corresponding maximum values, and reducing the reference torque by a torque value when at least one of the reference values reaches or exceeds its corresponding maximum value.

Other embodiment provide a regulation device including the following components: a memory unit, which is designed to provide reference values for stator and rotor currents, wherein the reference value for the stator current and/or the reference value for the rotor current or an auxiliary variable representing the reference value for the stator current and/or an auxiliary variable representing the reference value for the rotor current is dependent on a predetermined reference torque, and maximum values for stator and rotor currents, and a processing unit, which is designed to compare the reference values for stator and rotor currents with the corresponding maximum values for stator and rotor currents and which is further designed to reduce the predetermined reference torque if at least one reference value for stator and rotor currents reaches or exceeds the corresponding maximum value.

Figure 1:
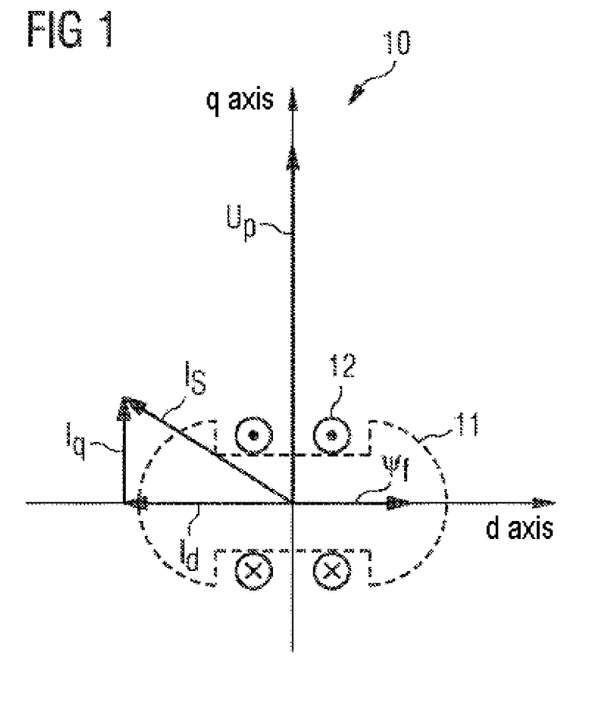
FIG. 1 shows, schematically, the rotor of a separately excited synchronous machine and a dq coordinate system oriented on the magnetic rotor flux.

Electric machines, in particular synchronous machines, are generally regulated by means of vector regulation, also referred to as field-oriented regulation, using a converter. In order to implement field-oriented regulation, a Cartesian coordinate system 10 is introduced which has a d axis and a q axis, wherein the d axis is oriented on the magnetic rotor flux (or excitation flux), with the result that the coordinate system rotates at the rotor speed, fixedly with the rotor. This simplifies the use of the model equations in terms of regulation technology. FIG. 1 illustrates, by way of example, a rotor 11 of a separately excited synchronous machine with salient rotor poles in the form of a salient-pole rotor. This rotor has a rotor winding 12, wherein the energization direction (cross: current flows into the plane of the drawing; dot: current flows out of the plane of the drawing) is indicated.

A rotor flux $\Psi_f$ which is positioned on the d axis of the dq coordinate system results from the energization direction. The q axis of this coordinate system is located orthogonal to the d axis. In this dq reference system, a stator current vector $I_S$ can be expressed via a d component (current vector) $I_d$ and a q component (current vector) $I_q$. For simplicity's sake, vector notation is not used in vectorial variables below. A field emf $U_p$ of the synchronous machine is oriented in the q axis of the dq reference system, as shown. In the example depicted, the current vector $I_d$ is located on the negative d axis counter to the rotor flux $\Psi_f$. This is referred to as field-weakening operation since the current (vector) $I_d$ generates a flux component (for example $\Psi_d$) which is in the opposite direction to the excitation flux $\Psi_f$, with the result that the resulting flux is reduced. In the case of separately excited synchronous machines, the field weakening can be implemented by virtue of the additional degree of freedom of a variable field current $I_f$ in comparison with permanent magnet machines.

Figure 2:
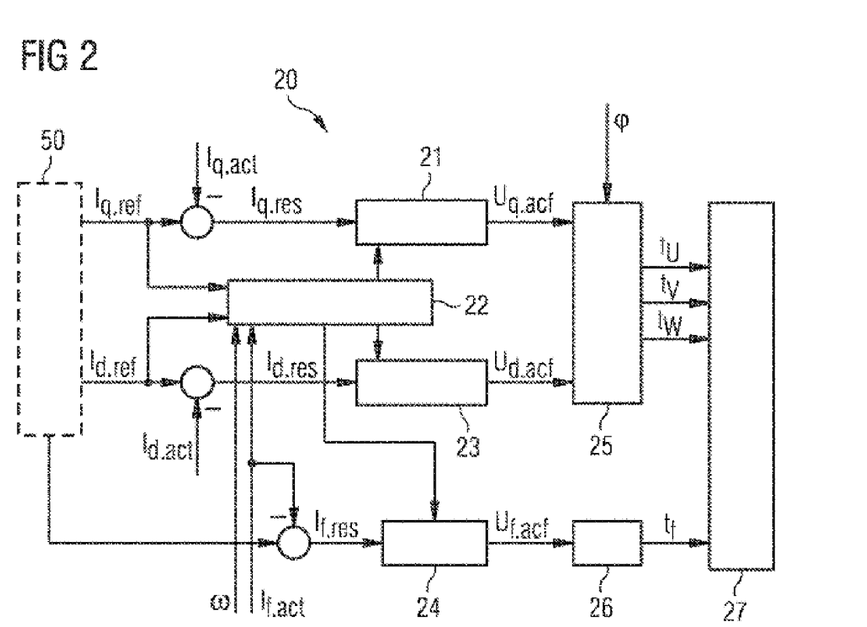
FIG. 2 shows, by way of example in a signal flow diagram, the structure of current regulation for a separately excited synchronous machine.

FIG. 2 shows, by way of example, the signal flow diagram of possible current or torque regulation for a separately excited synchronous machine with reference to the dq reference system. This regulation structure has reference current processing and a derating 50, which provides reference values $I_{q.ref}$ and $I_{d.ref}$ for the current regulation, i.e. a current vector for current-vector-based, field-oriented torque regulation. In each case one PI current controller 21, 23 is provided for $I_{q.ref}$, the reference value for the q component of the stator current, and for $I_{d.ref}$, the reference value for the q component of the stator current. Feedforward control 22 for the d component and for the q component of the stator current provides the two PI controllers with a value which is independent of the states of the controlled system (controlled system: for example synchronous machine and converter), in particular independent of the determined active currents $I_{q.act}$, $I_{d.act}$ prevailing in the machine. The active currents $I_{q.act}$, $I_{d.act}$ represent the stator current actually flowing in the controlled system in the dq reference system. The feedforward control makes it possible to take into consideration the manipulated variable requirement to be expected on the basis of the setpoint value profile, wherein the d component and the q component can be taken into consideration as manipulated or reference variables in current regulation. The feedforward control therefore substantially serves the purpose of improving the response to setpoint changes of the current regulation by compensation of switching dead times, without endangering the stability of the regulation.

The reference current processing with derating 50 may result in a field current $I_{f,ref}$ which is likewise regulated via a PI controller 24. The PI current controllers 21, 23, 24 produce corresponding voltages $U_{q.ref}$, $U_{d.ref}$ and $U_{f.ref}$, wherein the stator voltages $U_{q.ref}$, $U_{d.ref}$ are described as the currents in the dq system. The voltages $U_{q.ref}$, $U_{d.ref}$ and $U_{f.ref}$ are supplied to a switching time processor 25, 26. Output signals $t_u$, $t_v$, $t_w$, $t_f$ from the switching time processors 25, 26 are in turn supplied to the power stage with converter 27, which ultimately controls the power applied to the synchronous machine. Advantageously, a transformation from the dq system into, for example, a stator-oriented coordinate system should be performed for the stator variables, in particular the stator voltages $U_{q.ref}$, $U_{d.ref}$. For this purpose, the pole wheel angle $\Psi_P$ is supplied to the switching time processor 25, for example. The pole wheel angle $\phi_P$ (also load angle) is the angle at which the pole wheel of a synchronous machine (generally the rotor) leads or lags the rotating field generated by the stator winding depending on whether the machine is in the motor or generator mode. Such a transformation from the dq system into, for example, a stator-fixed coordinate system can be, for example, an inverse Park-Clark transformation.

Figure 3:
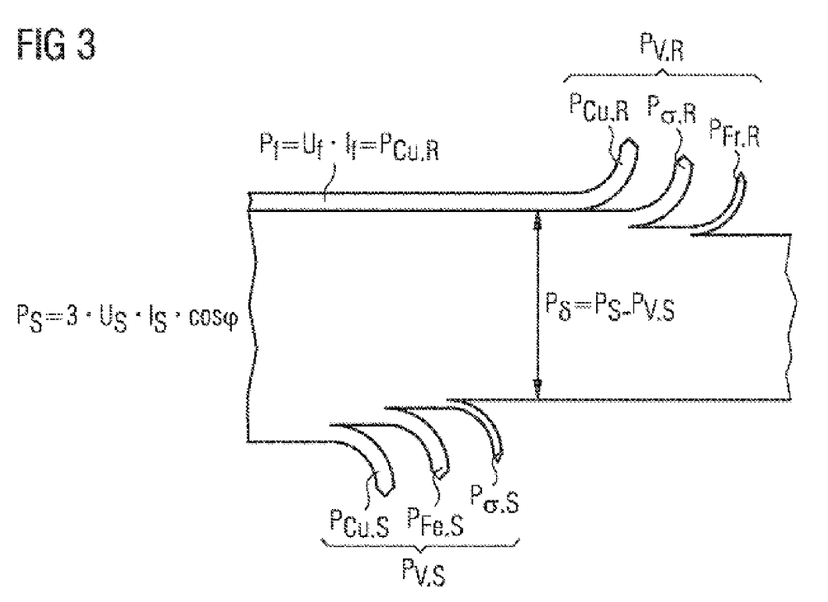
FIG. 3 shows, in a Sankey diagram, the substantial loss components of a separately excited synchronous machine.

An essential aspect in the current regulation of synchronous machines, in particular of separately excited synchronous machines used as drive assembly in motor vehicles, is the reduction in the losses of the drive system and the drive train (the drive train includes, for example: electric machine, shaft, differential gear, converter, electrical energy store (for example in mobile applications), regulation device). FIG. 3 shows, using a Sankey diagram, the essential loss components in a separately excited synchronous machine in the motor operating mode. A power $P_S = 3 \cdot U_S \cdot I_S \cdot \cos \phi$ is supplied to the stator, wherein $U_S$ is the stator voltage, $I_S$ is in this case the magnitude of the stator current, and $\phi$ is the (time) phase shift between the stator current and the stator voltage. The stator is subject to losses, wherein a power loss $P_{V.S}$ dissipated in the stator comprises copper losses $P_{Cu.S}$, core losses (in particular magnetization reversal losses, namely hysteresis losses and eddy current losses) $P_{Fe.S}$ and leakage losses $P_{q.S}$. The air gap power $P_\delta = P_S - P_{V.S}$ reaches the rotor. The air gap power $P_\delta$ is decreased by rotor losses $P_{V.R}$, wherein a mechanical power $P_{mech} = M_{mech} \cdot \omega_{mech}$ ($M_{mech}$: torque on the shaft; $\omega_{mech}$: angular velocity of the shaft) which is output at the rotor shaft is the air gap power $P_\delta$ minus the rotor losses $P_{V.R}$. The rotor losses $P_{V.R}$ substantially comprise copper losses $P_{Cu.R}$ of the rotor winding, leakage losses $P_{\sigma.R}$ in the rotor and friction losses $P_{Fr.R}$, such as bearing and air friction, for example.

In a separately excited synchronous machine, a power $P_f = U_f \cdot I_f = P_{Cu.R}$ is supplied to the rotor, wherein $U_f$ is the voltage at the rotor winding and $I_f$ is the field current in the rotor winding. Generally, the electrical variables supplied to the rotor are constant; i.e. the currents and voltages are direct currents and DC voltages. In particular the stator currents $I_S$ and the rotor current $I_f$ are regulated when designing the current regulation. Firstly the copper losses in the rotor $P_{Cu.R}$, which are proportional to the square of the field current $I_f$, and secondly the core losses in the stator $P_{Fe.S}$ are influenced via the rotor current $I_f$. The magnetic excitation flux $\Psi_f$ formed in the rotor is proportional to the field current $I_f$ in the rotor.

The rotor flux $\Psi_f$ is predominantly responsible for the stator-side core losses $P_{Fe.S}$ since the stator laminate stack is subject to a magnetic field which changes over time when the rotor is rotating, as a result of which in addition to the occurrence of material hysteresis (BH curve), in addition eddy currents are formed. Thus, in particular the core losses in the stator $P_{Fe.S}$ can be influenced via the field current in the rotor $I_f$. The copper losses or the $I^2R$ losses in the rotor winding $P_{Cu.R}$ are directly dependent on the magnitude of the field current. The magnitude of the stator current is in particular responsible for the copper losses or the $I^2R$ losses $P_{Cu.S}$ in the stator winding. The maximum losses in the electric machine may be limited accordingly. This serves the purpose firstly of preventing thermal overload of the machine and, since electric machines can be used in electric vehicles, for example, of reducing the consumption of electrical energy for example from a rechargeable battery, which is very important for mobile applications.

Figure 4:
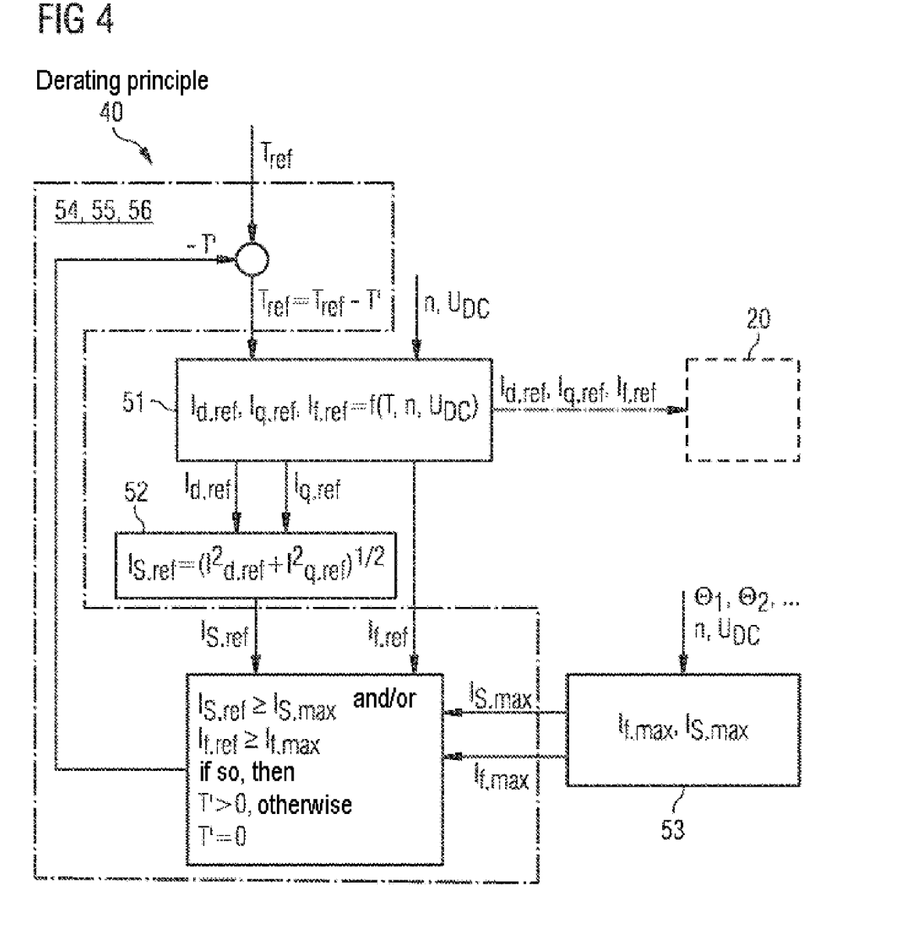
FIG. 4 shows, schematically in a diagram, a principle for torque reduction for the current regulation of a separately excited synchronous machine.

FIG. 4 illustrates by way of example, using a diagram, how the losses of the synchronous machine can be limited via a current derating method 40. In this case, the starting point is generally a three-dimensional lookup table, in which the currents $I_{d.ref}$, $I_{q.ref}$, $I_{f.ref}$ are each stored as functions of a reference torque $T_{ref}$, rotation speed n or intermediate circuit voltage $U_{DC}$. The reference values for stator currents $I_{d.ref}$, $I_{q.ref}$ (in each case with respect to the dq reference system) and for the rotor-side field current $I_{f.ref}$ which are supplied to the current regulation, result for a specific rotation speed n, a specific reference torque $T_{ref}$ and a specific intermediate circuit voltage $U_{DC}$. Finally, corresponding values for desired and actual torque should be made available with the determination of the reference values for the individual currents in order to ensure the losses-optimum operation as disclosed herein with respect to the essential loss components of the synchronous machine (see FIG. 3) taking into consideration the limiting parameters, such as the intermediate circuit voltage, for example. The loss optimization itself is implemented, by way of example, numerically on the basis of a simulation model iteratively for the three currents $I_{d.ref}$, $I_{q.ref}$, $I_{f.ref}$ depending on the rotation speed n, the reference torque $T_{ref}$ and the intermediate circuit voltage $U_{DC}$. Provision can be made for the three reference currents $I_{d.ref}$, $I_{q.ref}$, $I_{f.ref}$ to be stored in a lookup table 51 as a function of the reference torque $T_{ref}$, the rotation speed n and the intermediate circuit voltage $U_{DC}$, i.e.

$$I_{d.ref}, I_{q.ref}, I_{f.ref} = f(T_{ref}, n, U_{DC}),$$

with the result that the losses-optimum reference values for the currents can be interpolated. This therefore results, from an offline simulation, in a lookup table with losses-optimized reference currents for maximum possible torques.

The reference values do not absolutely explicitly need to be reference values for stator and/or rotor currents, for example in the dq reference system. As an alternative or in addition, auxiliary variables can also be used which are representative of stator and/or rotor currents. Such auxiliary variables can result, for example, from the mathematical or numerical models which are used for generating the lookup tables. An auxiliary variable can be determined, for example, from the ratio between the rotor current and the q component and/or the d component of the stator current. The use of auxiliary variables can be advantageous insofar as, in specific cases, transformation into the dq reference system of the rotor is superfluous, which means reduced computation complexity. The permissible maximum values are converted corresponding to the auxiliary values.

The use of lookup tables is very advantageous in the regulation of in particular electric machines since the magnetically active components, within wide ranges, have a pronounced nonlinear response. Nonlinear characteristics can be simulated by numerical approximation by means of a large number of suitable machine models and stored in lookup tables. In particular, the numerical approximation using FE models (numerical machine models in accordance with the finite element method) are capable of precisely simulating nonlinearities even in the saturation region. Although these strategies require considerable complexity in terms of memory for the resulting lookup tables, the advantages of increased stability, increased dynamics and improved steady-state regulation accuracy are provided in comparison with regulation concepts with fixed, analytically estimated parameters (lumped parameters).

In order to achieve high dynamics of the current regulation with losses-optimum operation during operation of a separately excited synchronous machine in real time, the disclosure proposes feedback via higher-level torque regulation which reduces the reference torque $T_{ref}$ if required, as a result of which finally the reference currents are reduced via the lookup table 51. For this purpose, first, for example, the magnitude 52 of the stator current $$I_{S.ref} = |\bar{I}_{S.ref}| = \sqrt{I_{d.ref}^2 + I_{q.ref}^2}$$

can be formed from the reference values for the individual stator current components with respect to the dq system. Maximum values, for example for the magnitudes of the stator current $I_{S.ref}$ and the field current $I_{f.ref}$, can be formed via a current derating 53 from operational parameters which represent the state of the controlled system, i.e. in particular the synchronous machine, for example the rotation speed n, the intermediate circuit voltage $U_{DC}$ and a large number of temperatures $\theta_1$, $\theta_2$, etc. The current derating 53 is designed such that these maximum values characterize, for example, previously fixed maximum losses $P_{V.S}$, $P_{V.R}$ of the synchronous machine. How high these losses can be specifically is dependent on where the machine is constructed and the nature of its design (for example: winding type, rotor type etc.). The maximum values for the currents are compared with the reference values from the lookup table 53. If at least one of the reference values from the lookup table reaches or exceeds the maximum values determined from the current derating, the predetermined reference torque is too high and needs to be reduced by a specific value T', with the result that the maximum values for the currents and therefore the maximum permissible losses are reached or undershot.

Figure 5:
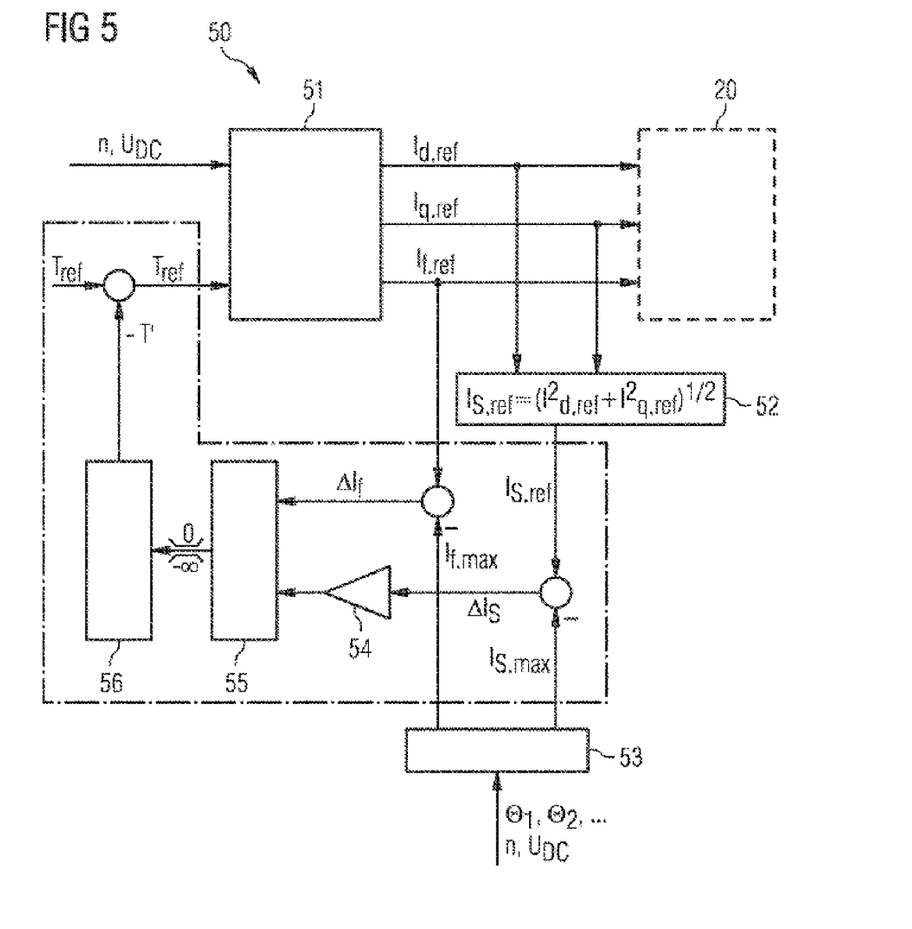
FIG. 5 shows, by way of example in a signal flow diagram, a current derating with higher-level torque regulation for torque regulation for regulating the current of a separately excited synchronous machine in accordance with the scheme shown in FIG. 4.

FIG. 5 shows, by way of example, in a signal flow diagram with reference current processing with derating 50, how in particular a current derating 53 with higher-level torque regulation 56 can be implemented in terms of regulation technology for torque reduction for regulating the current of a separately excited synchronous machine. Thus, operational parameters representing an operating point are predetermined as reference variables and reference values for the individual currents, for example with respect to the dq system, are formed from the lookup table 51 and supplied to the current regulation 20. The magnitude of the reference value of the stator current $I_{S.ref}$ can be formed from the reference values for the d and q components of the stator current. Using suitable measurement devices (for example rotation speed and temperature sensors), operational parameters representing the state of the controlled system, such as the rotation speed n, the intermediate circuit voltage $U_{DC}$ and a large number of temperatures $\theta_1$, $\theta_2$, etc. prevailing in the synchronous machine are determined. These are operating conditions or states which are actually prevailing in the machine.

In particular the determined temperatures can be a measure of the losses in the machine. Maximum values for the stator current $I_{S.max}$ and field current $I_{f.max}$ are determined from these operating conditions via the current derating 53. Particularly critical are the temperatures of the individual components, i.e. for example the stator and the rotor of the synchronous machine, the converter and excitation output stage (for example the power semiconductors). These temperatures can be measured and/or modeled during operation. Modeling of the temperatures can be advantageous in particular when determination using measurement technology is associated with considerable complexity. For example, it may be necessary to fit a large number of temperature sensors in the rotor, in particular on the rotor winding, in order to simulate the thermal conditions in the rotor in a manner which is as close to reality as possible. In this case, these temperature sensors need to be made electrically accessible, for example via slip rings. The possible number of slip rings and therefore the number of measurement points is very limited, however. A thermal model can in this case be used in addition to sensors or on its own. In each case one control deviation is formed from the reference values for the currents and the corresponding maximum values and supplied to a control deviation module 55.

At least the difference between the reference value for the stator current and the maximum value for the stator current $\Delta I_S = I_{S.ref} - I_{S.max}$ can be supplied to the control deviation module 55 via a scaling 54 in order to achieve identical conditions for the control deviation from the field currents $\Delta I_f = I_{f.ref} - I_{f.max}$. The orders of magnitude of the thermally effective stator current (rms value of the stator current) and the direct rotor current are different. For example, the stator current can assume rms values of approximately 300 A, whereas the direct rotor current can assume only values in the region of 18 A, for example. In order nevertheless to achieve in each case a suitable control loop response of the higher-level torque regulation, normalization of the currents either to the stator current or the rotor current can take place. In the present example, the control deviation of the stator current $\Delta I_S$ is scaled, as a result of which normalization of the stator current to the rotor current is achieved. A higher-level torque controller 56 receives a notification, via the control deviation module 55, to reduce the reference torque $T_{ref}$ by a torque value T' when the control deviations $\Delta I_S$, $\Delta I_f$ have reached a specific level, which is dependent on the application case. The threshold value determination is preferably designed such that the higher-level torque controller 56 can only reduce the reference torque $T_{ref}$ as desired, but cannot increase it.

In order to achieve regulation dynamics which are as high as possible with the torque regulation disclosed herein, a quick control loop is required for the rotor current (field current). Since the stator time constant is substantially lower than the rotor time constant, the dynamics of the control loop for the rotor current act as a limiting factor for the entire current regulation. The time constants relevant for the regulation are determined by the rotor or stator inductance and by the rotor inertia. Therefore, in particular the control reserve for the rotor current makes an essential contribution to the dynamics of the corresponding control loop.

An estimation of the rotor temperature can be used for the determination of the maximum values for the stator current and the rotor-side field current via the current derating 53. Since the rotor is heated actively by the $I^2R$ losses (copper losses) in the rotor winding and the rotor-side leakage losses, a reduction in the rotor current during operation of the synchronous machine can be required. The rotor temperature can be estimated, averaged, using a large number of temperature sensors positioned in the rotor, for example. However, this has the disadvantage that these sensors need to be made electrically accessible, for example via slip rings, which is complex and susceptible to faults. Alternatively, the rotor temperature can be determined via the measured field current and the rotor voltage (for example the setpoint voltage) fixed by the controller for the rotor current 26. In this way, the average rotor temperature can be approximated from the temperature-dependent nonreactive resistance of the rotor winding. In order to achieve in this case sufficient accuracy, in particular the nonlinearity of the power stage 27 and the voltage drop across the slip rings, which make the rotor winding electrically accessible, need to be compensated for in a suitable manner. Normally, this type of rotor temperature estimation is only possible above a specific field current.

The implementation of current regulation with derating (with respect to torque and reference currents) for example in accordance with the signal flow diagrams in FIG. 2 and FIG. 5 can be implemented, for example, by means of analogue or digital circuit technology using a microprocessor. In a processing unit of the microprocessor, the signal flow diagrams with their components can then be implemented digitally by means of a suitable program code.

Since the field-oriented torque regulation enables relatively high regulation dynamics, this principle is used in the case of synchronous machines, even and precisely in the case of separately excited synchronous machines. One aim of the present disclosure includes providing losses-optimized regulation, in particular losses-optimized torque regulation, with high regulation dynamics in comparison with conventional field-oriented regulation methods. Therefore, predictive torque or rotor flux regulation is proposed which is particularly suitable for losses-optimum operation of a separately excited synchronous machine.

As already mentioned, the time constant which is critical for the dynamics of the torque regulation of a separately excited synchronous machine is the rotor time constant, which is much greater than the stator time constant. Thus, the rotor circuit is the component of the torque regulation which limits the regulation dynamics. Predictive torque regulation envisages increasing or reducing the rotor current predictively before the active relevant parameters (for example torque, stator current, rotor current) prevailing in the machine would lead to a corresponding reaction of the regulation when the requirement of increased dynamics or a higher or lower torque is foreseeable, depending on the operating state. The requirement of increased dynamics, in particular increased driving dynamics when using the proposed regulation method in motor vehicles, can be determined, for example, by known methods for identifying the driving situation (for example extra-urban driving or urban driving). This can be performed, for example, using the driver's response by means of suitable algorithms. If the torque is increased, for example by means of increasing the rotor current, before it is actually required on the motor shaft, the high rotor time constant can therefore be bridged, with the result that only the stator time constant remains critical for the regulation dynamics. If the torque made available on the shaft, the actual torque, is intended to remain constant in the process, the stator current needs to be matched correspondingly. If more torque is required on the shaft, it is then only necessary to increase the stator current gradually. This applies correspondingly also for the case in which less torque is required, in which case the currents are reduced. By influencing the rotor current, the rotor or field flux is changed directly, and therefore the torque is changed.

A large number of components, for example stator and rotor winding and stator and rotor laminate stack, are arranged in the drive train of an electric machine, in particular a separately excited synchronous machine. The thermal load capacity, i.e. the maximum temperature which can prevail in the individual components (over a specific time), is very different in each case. The temperatures which are reached in the individual components during operation are dependent firstly on the current supplied (in the stator and rotor) and secondly on how effectively the individual components can be cooled. In electric machines with a rotor winding, the rotor winding, for example, tends towards thermal overloading at points in the center, when viewed axially, since the cooling is the least effective there.

Individual components can also be overloaded thermally at points in the losses-optimum operation. A large number of sensors and/or a suitable thermal model can give information on the instantaneous thermal loading of individual components, i.e. instantaneous temperatures. If these temperatures are above the thermal loading capacity, i.e. above the maximum permissible temperatures, measures need to be taken to avoid damage to the corresponding components. A separately excited synchronous machine has the advantage of an additional degree of freedom over the field current on comparison with a permanent magnet synchronous machine, for example. If, for example at a specific operating point, a component is thermally overloaded at losses-optimum currents and torques, the thermal loading of this component, ideally with a constant torque on the shaft, should be reduced. For this purpose, in the case of a separately excited synchronous machine, the ratio between the stator and rotor currents can be changed in such a way that the torque that can be tapped off at the shaft remains constant, but the thermal loading is made uniform, for example. Specifically this would mean that, for example in the case of a rotor winding which is thermally overloaded at points, the rotor current is reduced, but the stator current is correspondingly increased in order to ensure constant torque efficiency. This procedure ideally does not result in any change on the shaft, but generally the losses-optimum operation of the machine must be suspended at least temporarily.

Figure 6:
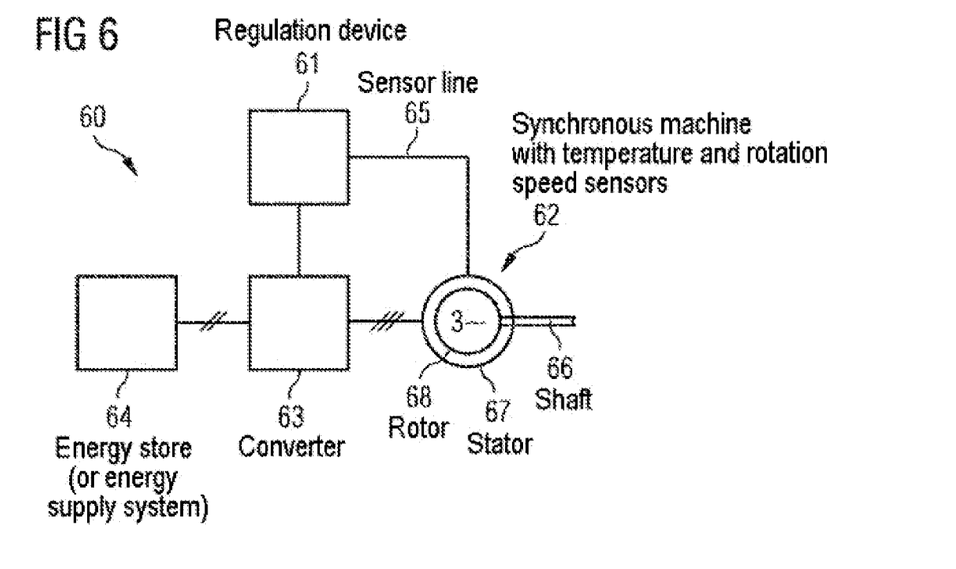
FIG. 6 shows, schematically, a drive train for an electric vehicle with a synchronous machine, a converter, a regulation device and an energy store.

FIG. 6 illustrates, by way of example, the essential components of a drive train 60 for an electric vehicle. In principle, however, the drive train of an electric vehicle does not differ from other applications of synchronous machines which require an electrical energy store. The essential components of the drive train 60 are a converter 63, a regulation device 61 with a sensor line 65, a synchronous machine 62 with a shaft 66. For the exemplary case of a mobile application in a hybrid vehicle or a purely electric vehicle, in addition an electrical energy store 64 is required as energy source instead of an energy supply system. The present disclosure is not restricted to mobile applications, however. The synchronous machine 62 has, as does any concentric, rotating electric machine, a stator 67, in which stator windings for generating a rotating field are arranged. In addition, a rotor 68 is arranged, mounted rotatably, in the synchronous machine, said rotor having a winding which is energized, for example, via slip rings in such a way that a rotor-side excitation field is produced, which can interact with the rotating field of the stator. In general, the rotor-side field current is a direct current. The synchronous machine 62 can in this case, together with an internal combustion engine, provide the propulsion for the vehicle; the term used is a hybrid vehicle.

There are numerous drive concepts for hybrid vehicles which are not discussed in any more detail here. Secondly, the synchronous machine 62 can also be provided without an internal combustion engine in a purely electric vehicle as the only drive assembly. The synchronous machine 62 belongs to the type of three-phase machines. The rotation speed and torque regulation via a converter 63 is widespread for three-phase machines. The electric power required for generating mechanical torques on the shaft 66 is supplied to the synchronous machine 62 via the converter 63. The converter 63 draws this power in the case of a motor vehicle in the form of DC voltage or direct current typically from the electrical energy store 64. This energy store 64 can be an electrochemical energy store, for example a rechargeable battery. It is quite conceivable for an electrochemical energy store to also be combined with electrostatic energy stores, for example capacitor batteries. The converter 66 is actuated by a regulation device 61, which ultimately ensures that the electrical power required precisely for the operating state of the motor vehicle (which should moreover also cover the losses in the drive train) is supplied to the synchronous machine 62. In order to limit the losses in particular in the electric machine, the regulation device may require, in addition to the active currents in the machine, also information in respect of which operating conditions prevail in the machine, for example. For this purpose, for example, temperature sensors 651 and rotation speed sensors 652 are provided in the machine, with the measured values from said sensors being supplied to the regulation device 61 via a sensor line 65.

Figure 7:
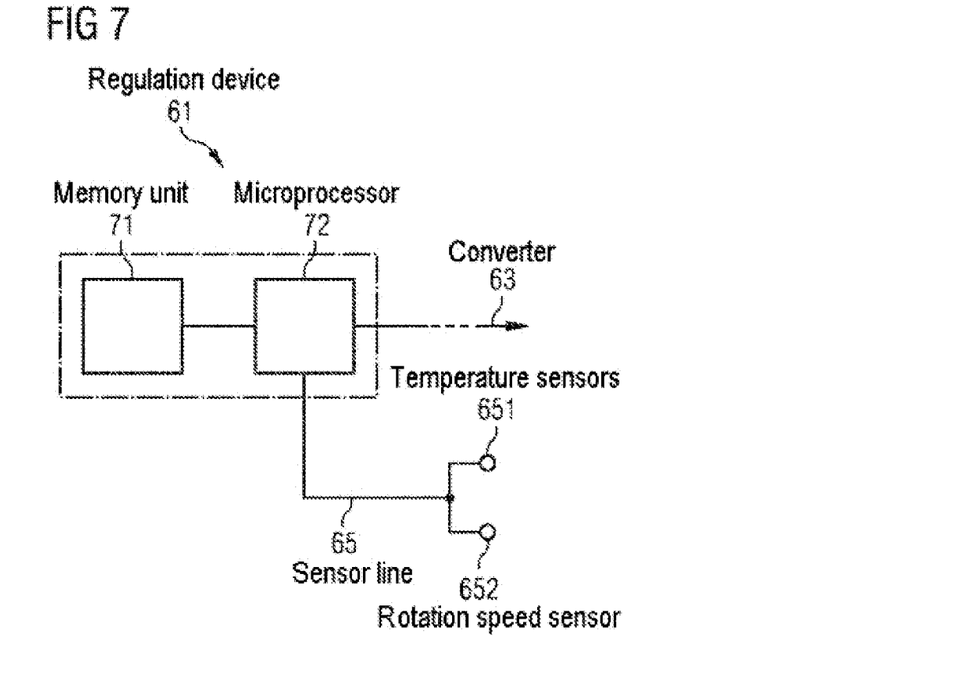
FIG. 7 shows, schematically, essential components of a regulation device for the current regulation of a synchronous machine.

In an advantageous embodiment, as sketched by way of example in FIG. 7, the regulation device 61 has substantially a memory unit 71 and a microprocessor 72, wherein the microprocessor 72 actuates the converter 63. The current regulation can be implemented digitally, for example, in the microprocessor 72. For this purpose, the measured values representing the operating conditions prevailing in the machine also need to be supplied to the microprocessor 72 via the sensor line 65. In order to implement the current regulation, in particular the dynamic determination of losses-optimized reference values for currents and torques via suitable lookup tables, a memory unit 71 connected to the microprocessor 72 needs to be provided. The memory location on the memory unit 71 in this case needs to have a size sufficient for storing the lookup tables to which the microprocessor 72 needs to gain access.

Although the above-explained examples relate in particular to hybrid vehicles, the present disclosure is not restricted to mobile applications such as in motor vehicles, but can have various uses.

REFERENCE SYMBOLS 10 dq coordinate or reference system
11 Separately excited rotor with salient poles
12 Rotor winding with energization direction
$U_S$ Field emf
$I_S$ Stator current
$I_q$ q component of stator current (q current)
$I_d$ d component of stator current (d current)
$\Psi_f$ Rotor or excitation flux
$P_f$ Excitation power in the rotor
$P_S$ Supplied power in the stator
$P_\delta$ Air gap power
$P_{Cu.S}$ Copper losses ($I^2R$ losses) in the stator winding
$P_{Fe.S}$ Core or magnetization reversal losses in the stator
$P_{o.S}$ Leakage losses in the stator
$P_{V.S}$ Total stator losses
$P_{V.R}$ Total rotor losses
$P_{Cu.R}$ Copper loses ($I^2R$ losses) in the rotor winding
$P_{o.R}$ Leakage losses in the rotor
$P_{Fr.R}$ Friction losses
20 Current regulation of a synchronous machine
21 PI controller for q current
22 Feedforward control
23 PI controller for d current
24 PI controller for field current
25 Switching time processor
26 Switching time processor
27 Power stage with converter
50 Reference current processing and derating
51 Lookup table (LUT)
52 Magnitude formation of the stator current
53 Current derating
54 Scaling (of control deviations)
55 Control deviation module
56 Torque controller

What is claimed is:

1. A regulation method for a separately excited synchronous machine having a stator and a rotor, the regulation method comprising:
providing reference values for stator and rotor currents, wherein at least one of the reference value for the stator current, the reference value for the rotor current, an auxiliary variable representing the reference value for the stator current, and an auxiliary variable representing the reference value for the rotor current is dependent on a predetermined reference torque,
providing maximum values for stator and rotator currents,
comparing at least one of the reference values with a corresponding one of the maximum values, and
reducing the reference torque by a torque value in response to the at least one reference values reaching or exceeding the corresponding maximum value.

2. The regulation method of claim 1, wherein the reference values are stored in a lookup table, and wherein the reference values each correspond to a minimum-losses operating point, represented by corresponding operational parameters.

3. The regulation method of claim 1, wherein maximum values for stator and rotor currents are dependent on temperatures of specific components of the synchronous machine, on a rotation speed, and on an intermediate circuit voltage.

4. The regulation method of claim 3, wherein the maximum values for stator and rotor currents are dependent on temperatures of at at least one of the following types of specific components of the synchronous machine: a stator winding, a rotor winding, a stator laminate stack, a rotor laminate stack, and a rotor bearing.

5. The regulation method of claim 4, wherein the rotation speed is also taken into consideration.

6. The regulation method of claim 1, in which wherein a torque value, reduced by the reference torque, is dependent on at least one of (a) the difference between the reference value for the rotor current and the maximum value for the rotor current and (b) the difference between the reference value for the stator current and the maximum value for the stator current.

7. The regulation method of claim 1, comprising scaling a difference between the reference value for the stator current and the maximum value for the stator current prior to the reduction in the reference torque.

8. The regulation method of claim 1, comprising:
comparing a plurality of temperatures for the synchronous machine with a plurality of maximum temperatures, and varying at least one of the stator current and the rotor current in response to at least one of the plurality of maximum temperatures being reached or exceeded such that at least one of the plurality of maximum temperatures is subsequently undershot.

9. The regulation method of claim 1, further comprising a predictive torque regulation process, in which the rotor current is increased or reduced predictively based on at least one of (a) an expected load on the shaft and (b) expected regulation dynamics.

10. The regulation method of claim 1, wherein at least one of the auxiliary variable representing the reference value for the stator current and the auxiliary variable representing the reference value for the rotor current is formed from a ratio between the rotor current and a q component of the stator current.

11. A regulation device configured to regulate a separately excited synchronous machine with a stator and a rotor with low losses, the regulation device comprising:

a memory unit configured to provide:

reference values for stator and rotor currents, wherein at least one of the reference value for the stator current, the reference value for the rotor current, an auxiliary variable representing the reference value for the stator current, and an auxiliary variable representing the reference value for the rotor current is dependent on a predetermined reference torque, and maximum values for stator and rotor currents, and a processing unit configured to:

compare at least one of the reference values with a corresponding maximum value, reduce the predetermined reference torque in response to the at least one reference value reaching or exceeding the corresponding maximum value.

* * * * *